(12) United States Patent
Tsukizaki et al.

(10) Patent No.: US 10,293,811 B2
(45) Date of Patent: May 21, 2019

(54) HYBRID VEHICLE POWER GENERATION CONTROL DEVICE

(71) Applicant: Nissan Motor Co., Ltd., Yokohama-shi, Kanagawa (JP)

(72) Inventors: Atsushi Tsukizaki, Kanagawa (JP); Masato Koga, Kanagawa (JP); Hidekazu Yagi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/572,810

(22) PCT Filed: Jun. 1, 2015

(86) PCT No.: PCT/JP2015/065777
§ 371 (c)(1),
(2) Date: Nov. 9, 2017

(87) PCT Pub. No.: WO2016/194106
PCT Pub. Date: Dec. 8, 2016

(65) Prior Publication Data
US 2018/0154886 A1 Jun. 7, 2018

(51) Int. Cl.
*B60W 10/06* (2006.01)
*B60W 20/00* (2016.01)
(Continued)

(52) U.S. Cl.
CPC ............... *B60W 20/40* (2013.01); *B60K 6/36* (2013.01); *B60K 6/38* (2013.01); *B60K 6/442* (2013.01);
(Continued)

(58) Field of Classification Search
CPC ...... B60W 20/40; B60W 10/02; B60W 10/11; B60W 30/18054; B60W 10/26; B60W 10/08; B60W 20/13; B60W 10/06; B60W 20/00; B60W 2510/244; B60W 2520/04; B60W 2710/0644; B60W 2710/244;
(Continued)

(56) References Cited

U.S. PATENT DOCUMENTS 8,745,332 B2 6/2014 Benhase et al.
9,346,463 B2 * 5/2016 Koike ................... B60K 6/442
(Continued)

FOREIGN PATENT DOCUMENTS

FR 2966786 A3 5/2012
FR 3007696 A1 1/2015
(Continued)

*Primary Examiner* — Charles A Fox
*Assistant Examiner* — Lillian T Nguyen
(74) *Attorney, Agent, or Firm* — Global IP Counselors, LLP

(57) ABSTRACT

A power generation control device is provided for a hybrid vehicle that prevents unintended engagement of a released engagement clutch during idle power generation. An internal combustion engine is operated during idle power generation so that the input-output differential rotation speed of engagement clutches for selectively connecting an electric motor and/or the internal combustion engine to the drive wheel becomes a value greater than or equal to a rotation difference threshold value at which the engagement clutches are not engaged.

6 Claims, 7 Drawing Sheets

(51) Int. Cl.
    *B60K 6/442* (2007.10)
    *B60K 6/547* (2007.10)
    *B60W 20/40* (2016.01)
    *B60W 10/08* (2006.01)
    *B60W 10/11* (2012.01)
    *B60W 10/26* (2006.01)
    *B60W 30/18* (2012.01)
    *B60W 20/13* (2016.01)
    *B60K 6/36* (2007.10)
    *B60K 6/38* (2007.10)
    *B60W 10/02* (2006.01)

(52) U.S. Cl.
    CPC ............ *B60K 6/547* (2013.01); *B60W 10/02* (2013.01); *B60W 10/06* (2013.01); *B60W 10/08* (2013.01); *B60W 10/11* (2013.01); *B60W 10/26* (2013.01); *B60W 20/00* (2013.01); *B60W 20/13* (2016.01); *B60W 30/18054* (2013.01); *B60W 2510/244* (2013.01); *B60W 2520/04* (2013.01); *B60W 2710/0644* (2013.01); *B60W 2710/244* (2013.01); *B60Y 2200/92* (2013.01); *B60Y 2300/427* (2013.01); *Y02T 10/6234* (2013.01); *Y02T 10/6286* (2013.01); *Y02T 10/7258* (2013.01); *Y10S 903/93* (2013.01); *Y10S 903/946* (2013.01)

(58) Field of Classification Search
    CPC . B60K 6/36; B60K 6/38; B60K 6/547; B60K 6/442; Y10S 903/946; Y10S 903/93; B60Y 2200/92; B60Y 2300/427; Y02T 10/7258; Y02T 10/6286; Y02T 10/6234
    See application file for complete search history.

(56) References Cited

U.S. PATENT DOCUMENTS

| | | | |
|---|---|---|---|
| 2013/0186233 A1* | 7/2013 | Kaltenbach | B60K 6/442 74/661 |
| 2014/0165780 A1 | 6/2014 | Fremau et al. | |
| 2015/0252876 A1* | 9/2015 | Meixner | F16H 3/093 475/159 |
| 2016/0091063 A1* | 3/2016 | Rekow | B60W 30/188 475/153 |

FOREIGN PATENT DOCUMENTS

| | | |
|---|---|---|
| JP | 2011-161939 A | 8/2011 |
| JP | 2013-141938 A | 7/2013 |
| JP | 2015-96759 A | 5/2015 |
| WO | 2010/122664 A1 | 10/2010 |

\* cited by examiner

GEAR SHIFT PATTERN

| C2 | C3 | C1 Left | C1 N | C1 Right |
|---|---|---|---|---|
| N | N | EV – ICEgen | Neutral | EV – ICE 3rd |
| N | Left | EV 1st ICE 1st | EV 1st ICE – | EV 1st ICE 3rd |
| N | Left | Lock | EV 1st ICE 2nd | Lock |
| Left | N | EV 1.5 ICE 2nd | EV – ICE 2nd | Lock |
| Left | Right | Lock | EV 2nd ICE 2nd | Lock |
| N | Right | EV 2nd ICE 3rd' | EV 2nd ICE – | EV 2nd ICE 3rd |
| Right | Right | Lock | EV 2nd ICE 4th | Lock |
| Right | N | EV 2.5 ICE 4th | EV – ICE 4th | Lock |
| Right | Left | Lock | EV 1st ICE 4th | Lock |

FIG. 3

ROTATIONAL DIRECTION

US 10,293,811 B2

HYBRID VEHICLE POWER GENERATION CONTROL DEVICE

CROSS-REFERENCE TO RELATED APPLICATIONS

This application is a U.S. National stage application of International Application No. PCT/JP2015/065777, filed Jun. 1, 2015.

BACKGROUND

Field of the Invention

The present invention relates to a power generation control device for a hybrid vehicle that carries out idle power generation with an electric motor by receiving drive force from an internal combustion engine, based on a power generation request while the vehicle is stopped.

Background Information

Conventionally, in a hybrid vehicle comprising an electric motor and an internal combustion engine as power sources, a power generation device, which disconnects a clutch that connects the electric motor and the internal combustion engine to drive wheels while the vehicle is stopped and carries out idle power generation by driving a motor with the internal combustion engine, is known (for example refer to Japanese Laid-Open Patent Application No. 2011-161939— Patent Document 1).

SUMMARY

If a clutch that connects an electric motor and an internal combustion engine to drive wheels is disconnected during idle power generation as in the device disclosed in Patent Document 1, it is possible to prevent the vehicle from moving due to drive force that is generated by the internal combustion engine.

However, if an abnormality occurs in the power (actuator, or the like) that engages and disengages the clutch and a command to engage said clutch is output during idle power generation, there is the risk that the vehicle will suddenly begin to move. The device of Patent Document 1 does not take any preventive measures regarding this point, leaving room for improvement.

In view of the problems described above, an object of the present invention is to provide a power generation control device for a hybrid vehicle that prevents unintended engagement of a released engagement clutch during idle power generation.

In order to achieve the object described above, the hybrid vehicle of the present invention comprises an electric motor and an internal combustion engine as drive sources, and is provided with a transmission that realizes a plurality of gear shift stages in a drive system from the power sources to the drive wheel. The transmission has engagement clutches as shifting elements for switching the gear shift stage and for meshing engagement due to a stroke from a disengaged position. This hybrid vehicle is provided with a power generation controller that generates power with an electric motor by receiving drive force from an internal combustion engine based on a power generation request. When carrying out idle power generation with an electric motor while the vehicle is stopped, the power generation controller operates the internal combustion engine in a rotational speed range in which the differential rotation speed of the released engagement clutch becomes greater than or equal to a rotation difference threshold value at which engagement will not occur even by a stroke.

Therefore, when carrying out idle power generation with an electric motor while the vehicle is stopped, the internal combustion engine is operated in a rotational speed range in which the differential rotation speed of the released engagement clutch becomes greater than or equal to a rotation difference threshold value at which engagement will not occur even by a stroke. That is, the differential rotation speed of the released engagement clutch is maintained to be greater than or equal to a rotation difference threshold value at which engagement will not occur, even by a stroke. As a result, it is possible to prevent an unintended engagement of a released engagement clutch during idle power generation.

BRIEF DESCRIPTION OF THE DRAWINGS

Referring now to the drawings, a power generation control device is illustrated for a hybrid vehicle.

FIG. 3 is a gear shift pattern diagram illustrating the gear shift patterns according to the switching positions of three engagement clutches in a multistage gear transmission mounted on a hybrid vehicle to which is applied the power generation control device of the embodiment.

DETAILED DESCRIPTION OF THE EMBODIMENTS

Figure 1:
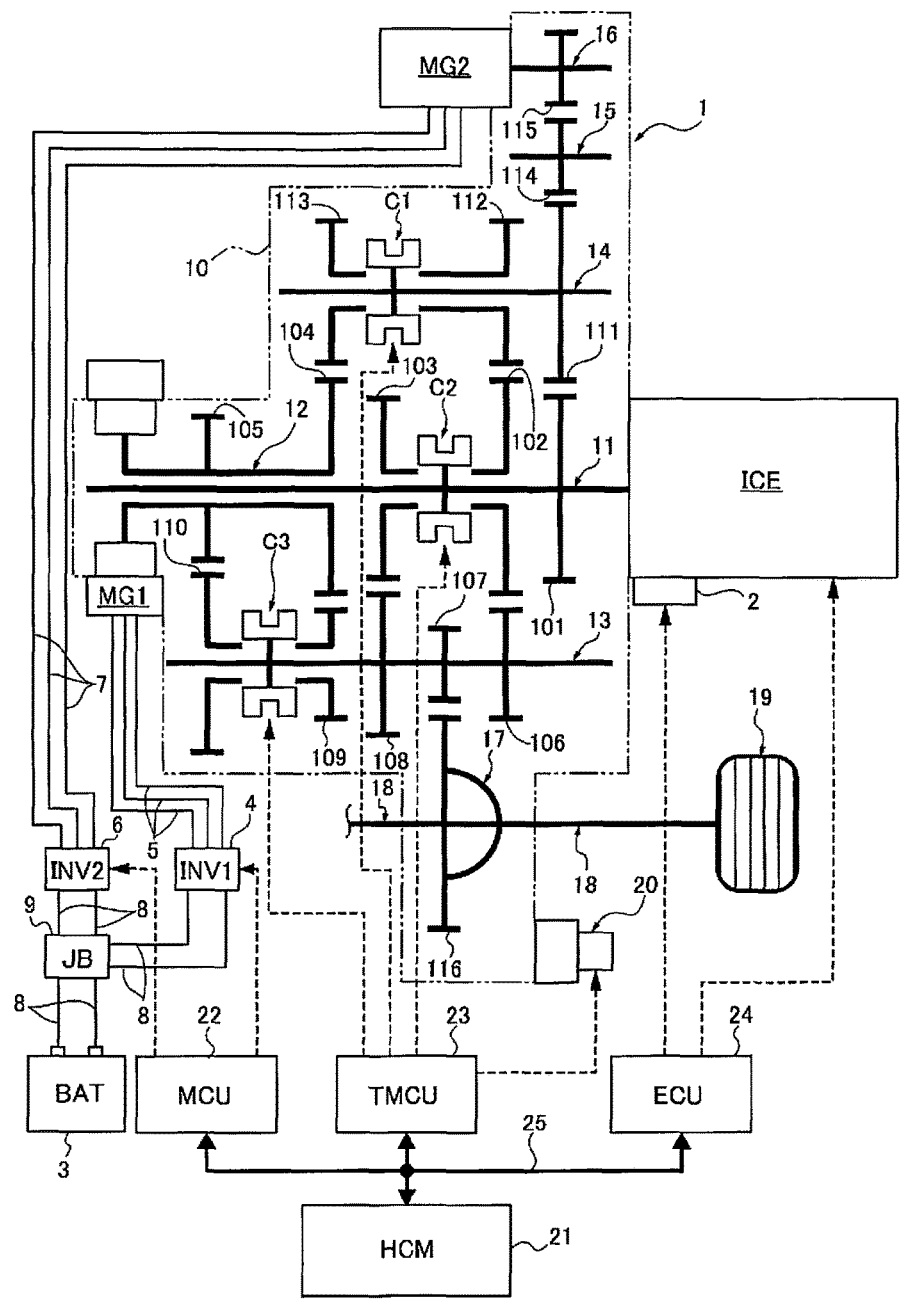
FIG. 1 is an overall system diagram illustrating a drive system and a control system of a hybrid vehicle to which is applied the power generation control device of an embodiment.

A preferred embodiment for realizing the power generation control device for a hybrid vehicle of the present invention is described below based on the embodiment illustrated in the drawings.

The configuration is described first. The power generation control device of the embodiment is applied to a hybrid vehicle (one example of a hybrid vehicle), comprising, as drive system components, one engine, two motor/generators, and a multistage gear transmission having three engagement clutches. The "overall system configuration,"

the "configuration of the shift control system," the "configuration of the gear shift patterns," the "configuration of the idle power generation control process," and the "configuration of the engagement clutches" will be separately described below with regard to the configuration of the power generation control device for a hybrid vehicle in the embodiment.

Overall System Configuration

FIG. 1 illustrates a drive system and a control system of a hybrid vehicle to which is applied the power generation control device of the embodiment. The overall system configuration will be described below based on FIG. 1.

The drive system of the hybrid vehicle comprises an internal combustion engine ICE, a first motor/generator MG1 (electric motor), a second motor/generator MG2, and a multistage gear transmission 1 having three engagement clutches C1, C2, C3, as illustrated in FIG. 1. Here, "ICE" is an acronym for "Internal Combustion Engine."

The internal combustion engine ICE is, for example, a gasoline engine or a diesel engine that is disposed in a front area of a vehicle such that the crankshaft direction is aligned with the vehicle width direction. The internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 remains available for when an MG2 start using a high-power battery 3 cannot be ensured, such as during extreme cold.

Both the first motor/generator MG1 and the second motor/generator MG2 are permanent-magnet type synchronous motors utilizing three-phase alternating current, having the high-power battery 3 as a common power source. The stator of the first motor/generator MG1 is fixed to a case of the first motor/generator MG1, and the case is fixed to the transmission case 10 of the multistage gear transmission 1. Then, a first motor shaft integrated with a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated with a rotor of the second motor/generator MG2 is connected to a sixth shaft 16 of the multistage gear transmission 1. A first inverter 4, which converts direct current into three-phase alternating current during powering and converts three-phase alternating current into direct current during regeneration, is connected to a stator coil of the first motor/generator MG1 via a first AC harness 5. A second inverter 6, which converts direct current into three-phase alternating current during powering and converts three-phase alternating current into direct current during regeneration, is connected to a stator coil of the second motor/generator MG2 via a second AC harness 7. The high-power battery 3, the first inverter 4, and the second inverter 6 are connected by a DC harness 8 via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1 (idle power generation engagement clutch), a second engagement clutch C2 and third engagement clutch C3 (engagement clutches) are provided as engagement clutches. The transmission case 10 is provided with an electric oil pump 20 that supplies lubrication oil to the meshing portions of the gears and the axle bearing portions inside the case.

The first shaft 11 is a shaft to which the internal combustion engine ICE is connected, and a first gear 101, a second gear 102, and a third gear 103 are disposed relative to the first shaft 11, in that order from the right in FIG. 1. The first gear 101 is integrally provided (including integral attachment) to the first shaft 11. The second gear 102 and the third gear 103 are idling gears, in which a boss portion that protrudes in the axial direction is inserted into the outer perimeter of the first shaft 11, and are provided so as to be drivably connectable to the first shaft 11 via the second engagement clutch C2.

The second shaft 12 is a shaft to which the first motor/generator MG1 is connected, and is a cylindrical shaft that is coaxially disposed with the axis aligned with the outer side position of the first shaft 11, and a fourth gear 104 and a fifth gear 105 are disposed relative to the second shaft 12, in that order from the right in FIG. 1. The fourth gear 104 and the fifth gear 105 are integrally provided (including integral attachment) to the second shaft 12.

The third shaft 13 is a shaft disposed on the output side of the multistage gear transmission 1, and a sixth gear 106, a seventh gear 107, an eighth gear 108, a ninth gear 109, and a tenth gear 110 are disposed relative to the third shaft 13, in that order from the right in FIG. 1. The sixth gear 106, the seventh gear 107, and the eighth gear 108 are integrally provided (including integral attachment) to the third shaft 13. The ninth gear 109 and the tenth gear 110 are idling gears, in which a boss portion that protrudes in the axial direction is inserted into the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 is a shaft in which both ends are supported by the transmission case 10, and an eleventh gear 111, a twelfth gear 112, and a thirteenth gear 113 are disposed relative to the fourth shaft 14, in order from the right side in FIG. 1. The eleventh gear 111 is integrally provided (including integral attachment) to the fourth shaft 14. The twelfth gear 112 and the thirteenth gear 113 are idling gears, in which a boss portion that protrudes in the axial direction is inserted into the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 is a shaft in which both ends are supported by the transmission case 10, and a fourteenth gear 114 that meshes with the eleventh gear 111 of the fourth shaft 14 is integrally provided thereto (including integral attachment).

The sixth shaft 16 is a shaft to which the second motor/generator MG2 is connected, and a fifteenth gear 115 that meshes with the fourteenth gear 114 of the fifth shaft 15 is integrally provided thereto (including integral attachment).

The second motor/generator MG2 and the internal combustion engine ICE are mechanically connected to each other by a gear train configured from the fifteenth gear 115, the fourteenth gear 114, the eleventh gear 111, and the first gear 101, which mesh with each other. The gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2 by the driving of the internal combustion engine ICE.

The first engagement clutch C1 is a dog clutch that is interposed between the twelfth gear 112 and the thirteenth gear 113 of the fourth shaft 14, and that is engaged by an engagement stroke in a rotationally synchronized state without possessing a synchronization mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch that is interposed between the second gear 102 and the third gear 103 of the first shaft 11, and that is engaged by an engagement stroke in a rotationally synchronized state without possessing a synchronization mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released and the first shaft 11 and the third gear 103 are released. When the second engagement clutch C2 is in a right engagement position (Right), the first shaft 11 and the second gear 102 are drivingly connected.

The third engagement clutch C3 is a dog clutch that is interposed between the ninth gear 109 and the tenth gear 110 of the third shaft 13, and that is engaged by an engagement stroke in a rotationally synchronized state without possessing a synchronization mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral attachment) to the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means having a function to appropriately manage the energy consumption of the entire vehicle. This hybrid control module 21 is connected to the other control units (motor control unit 22, transmission control unit 23, engine control unit 24, etc.) so as to be capable of bidirectional information exchange via a CAN communication line 25. The "CAN" in CAN communication line 25 is an acronym for "Controller Area Network."

The motor control unit 22 (acronym: "MCU") carries out powering control, regeneration control and the like of the first motor/generator MG1 and the second motor/generator MG2 via control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque when a target motor torque to be shared with respect to a target drive force is determined. In the "rotational speed FB control," a control is carried out in which a target motor rotation speed, with which the input-output rotational speeds of the clutch are synchronized, is determined, and an FB torque is output so as to converge the actual motor rotation speed with the target motor rotation speed, when there is a gear shift request to meshing engage any one of the engagement clutches C1, C2, C3 during travel.

The transmission control unit 23 (acronym: "TMCU") carries out a shift control for switching the gear shift pattern of the multistage gear transmission 1 by outputting a current command to electric actuators 31, 32, 33 (refer to FIG. 2) based on predetermined input information. In this shift control, the engagement clutches C1, C2, C3 are selectively meshing engaged and/or meshing disengaged, and a gear pair involved in power transmission is selected from a plurality of pairs of gear pairs. Here, at the time of a gear shift request to engage any one of the released engagement clutches C1, C2, C3, in order to suppress differential rotation speed between the input-output of the clutch to ensure meshing engagement, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like, by outputting a control command to the motor control unit 22, the spark plugs, fuel injection actuator, or the like, based on predetermined input information.

Configuration of the Shift Control System

The multistage gear transmission 1 according to the embodiment is characterized in that efficiency is achieved by reducing drag by employing engagement clutches C1, C2, C3 (dog clutch) as shifting elements that are meshing engaged. Then, when there is a gear shift request to meshing engage any one of the engagement clutches C1, C2, C3, the differential rotation speeds of the input-output of the clutch are synchronized with the first motor/generator MG1 (when the engagement clutch C3 is engaged) or the second motor/generator MG2 (when the engagement clutches C1, C2 are engaged), and an engagement stroke is started once the rotational speed falls within a synchronization determination rotational speed range, to realize the gear shift. In addition, when there is a gear shift request to release any one of the engaged engagement clutches C1, C2, C3, the clutch transmission torque of the release clutch is reduced, and a disengagement stroke is started once the torque becomes less than or equal to a release torque determination value, to realize the gear shift. The configuration of the shift control system of the multistage gear transmission 1 is described below based on FIG. 2.

Figure 2:
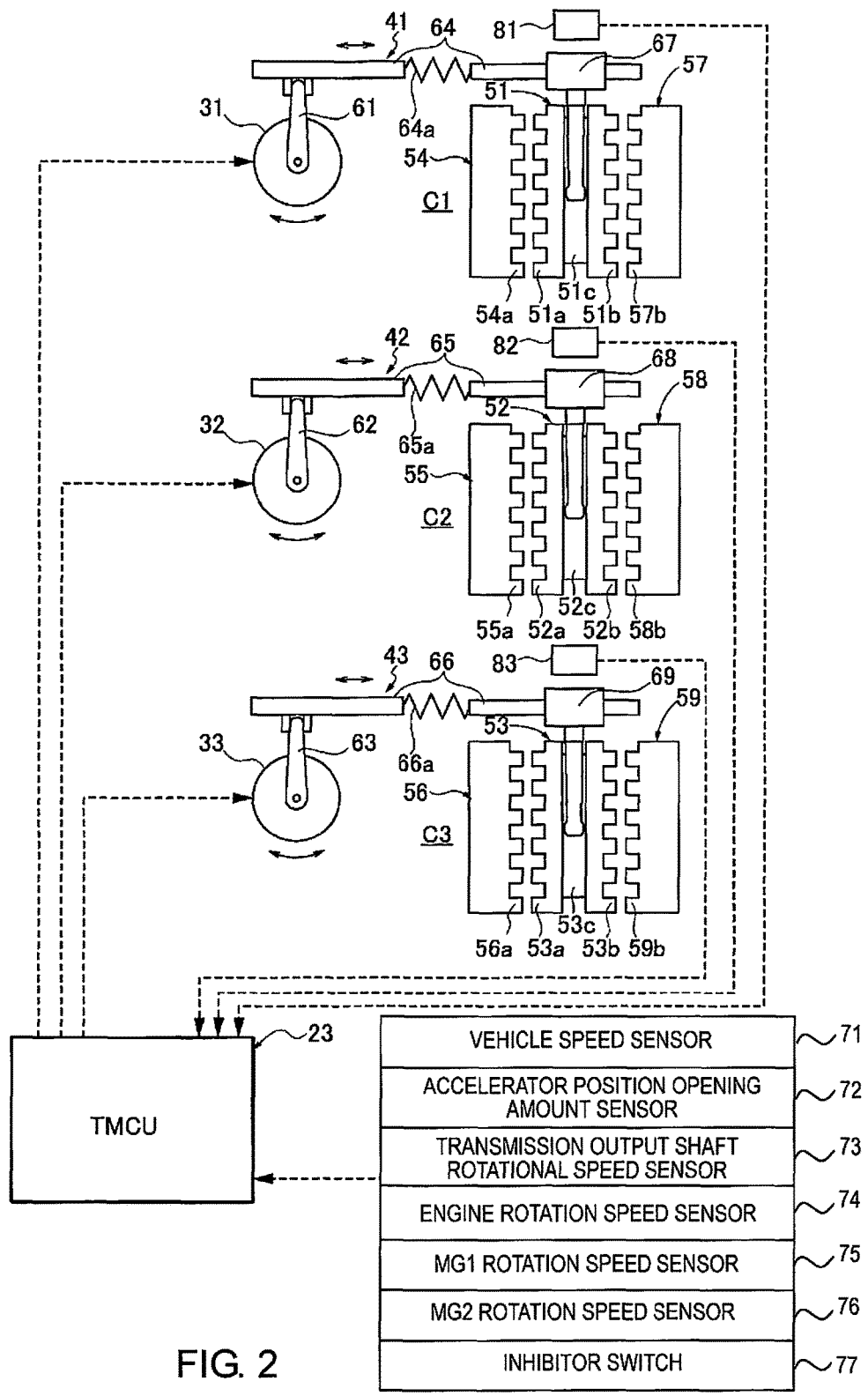
FIG. 2 is a control system block diagram illustrating the configuration of a shift control system of a multistage gear transmission mounted on a hybrid vehicle to which is applied the power generation control device of the embodiment.

The shift control system comprises, as engagement clutches, a first engagement clutch C1, a second engagement clutch C2, and a third engagement clutch C3, as illustrated in FIG. 2. A first electric actuator 31, a second electric actuator 32, and a third electric actuator 33 are provided as actuators. A first engagement clutch operating mechanism 41, a second engagement clutch operating mechanism 42, and a third engagement clutch operating mechanism 43 are provided as mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing-engagement position), and a right engagement position (Right: right side clutch meshing-engagement position). The engagement clutches C1, C2, C3 all have the same configuration, comprising coupling sleeves 51, 52, 53, left dog clutch rings 54, 55, 56, and right dog clutch rings 57, 58, 59. The coupling sleeves 51, 52, 53 are provided so as to be strokable in the axial direction by a spline connection via a hub, which is not shown, fixed to the fourth shaft 14, the first shaft 11, and the third shaft 13, and have dog teeth 51a, 51b, 52a, 52b, 53a, 53b on both sides having flat top faces. Furthermore, fork grooves 51c, 52c, 53c are provided to the circumferential center portions of the coupling sleeves 51, 52, 53. The left dog clutch rings 54, 55, 56 are fixed to the boss portions of the gears 113, 103, 110, which are left idling gears of the engagement clutches C1, C2, C3 and have dog teeth 54a, 55a, 56a with flat top surfaces that oppose the dog teeth 51a, 52a, 53a. The right dog clutch rings 57, 58, 59 are fixed to the boss portions of the gears 112, 102, 109, which are right idling gears of the engagement clutches C1, C2, C3 and have dog teeth 57b, 58b, 59b with flat top surfaces that oppose the dog teeth 51b, 52b, 53b.

The first engagement clutch operating mechanism 41, the second engagement clutch operating mechanism 42, and the third engagement clutch operating mechanism 43 are mechanisms for converting the turning motions of the electric actuators 31, 32, 33 into axial stroke motions of the coupling sleeves 51, 52, 53. The engagement clutch operating mechanisms 41, 42, 43 all have the same configuration, comprising turning links 61, 62, 63, shift rods 64, 65, 66, and shift forks 67, 68, 69. One end of each of the turning links 61, 62, 63 is provided to the actuator shafts of the electric actuators 31, 32, 33, respectively, and each of the other ends is connected to the shift rods 64, 65, 66, respectively, so as to be relatively displaceable. The shift rods 64, 65, 66 are configured to be capable of expanding and contracting as a function of the magnitude and the direction of the rod transmitting force by means of springs 64a, 65a, 66a interposed in the rod dividing positions. One end of each of the shift forks 67, 68, 69 is fixed to the shift rods 64, 65, 66, respectively, and each of the other ends are respectively disposed in the fork grooves 51c, 52c, 53c of the coupling sleeves 51, 52, 53.

The transmission control unit 23 inputs sensor signals and switch signals from a vehicle speed sensor 71, an accelerator position opening amount sensor 72, a transmission output shaft rotation speed sensor 73, an engine rotation speed sensor 74, an MG1 rotation speed sensor 75, an MG2 rotation speed sensor 76, an inhibitor switch 77, and the like. The transmission output shaft rotation speed sensor 73 is provided to the shaft end portion of the third shaft 13 and detects the shaft rotation speed of the third shaft 13. Then, a position servo control unit (for example a position servo system by PID control) is provided, which controls meshing-engagement and meshing-disengagement of the engagement clutches C1, C2, C3, determined by the positions of the coupling sleeves 51, 52, 53. The position servo control unit inputs sensor signals from a first sleeve position sensor 81, a second sleeve position sensor 82, and a third sleeve position sensor 83. Then, the sensor values of the sleeve position sensors 81, 82, 83 are read, and current is imparted to the electric actuators 31, 32, 33 such that the positions of the coupling sleeves 51, 52, 53 will be in the disengaged position or the engagement position according to an engagement stroke. That is, by setting an engaged state in which the dog teeth welded to the coupling sleeves 51, 52, 53 and the dog teeth welded to the idling gears are both in engagement positions meshed with each other, the idling gears are drivingly connected to the fourth shaft 14, the first shaft 11, and the third shaft 13. On the other hand, by setting a disengaged state in which the dog teeth welded to the coupling sleeves 51, 52, 53 and the dog teeth welded to the idling gears are in non-engagement positions by displacement of the coupling sleeves 51, 52, 53 in the axial direction, the idling gears are disconnected from the fourth shaft 14, the first shaft 11, and the third shaft 13.

Configuration of the Gear Shift Pattern

The multistage gear transmission 1 of the present embodiment features size reduction achieved by reducing the power transmission loss without a differential rotation absorbing element, such as a fluid coupling, and by reducing the gear shift stages of the ICE by providing motor assistance to the internal combustion engine ICE (EV gear shift stages: 1-2 speed, ICE gear shift stages: 1-4 speed). The configuration of the representative gear shift patterns of the multistage gear transmission 1 is described below based on FIG. 3.

The gear shift patterns obtainable by the multistage gear transmission 1 having engagement clutches C1, C2, C3 are as shown in FIG. 3. In FIG. 3, "Lock" represents an interlock pattern that is not applicable as a gear shift pattern, "EV-" represents a state in which the first motor/generator MG1 is not drivingly connected to the driving wheels 19, and "ICE-" represents a state in which the internal combustion engine ICE is not drivingly connected to the driving wheels 19. During the shift control, it is not necessary to use all the gem: shift patterns shown in FIG. 3, and it is of course possible to select from these gear shift patterns according to need. Each of the gear shift patterns is described below.

When the second engagement clutch C2 is in the "N" position and the third engagement clutch C3 is in the "N" position, the following gear shift patterns are obtained according to the position of the first engagement clutch C1. "EV-ICEgen" is obtained if the first engagement clutch C1 is in the "Left" position, "Neutral" is obtained if the first engagement clutch C1 is in the "N" position, and "EV- ICE3rd" is obtained if the first engagement clutch C1 is in the "Right" position. Here, the gear shift pattern "EV-ICEgen" is a pattern selected at the time of MG1 idle power generation, in which power is generated in the first motor/generator MG1 by the internal combustion engine ICE when the vehicle is stopped, or, at the time of double idle power generation, in which MG2 power generation is carried out in addition to MG1 power generation. The gear shift pattern "Neutral" is a pattern selected at the time of MG2 idle power generation, in which power is generated in the second motor/generator MG2 by the internal combustion engine ICE when the vehicle is stopped.

Figure 4:
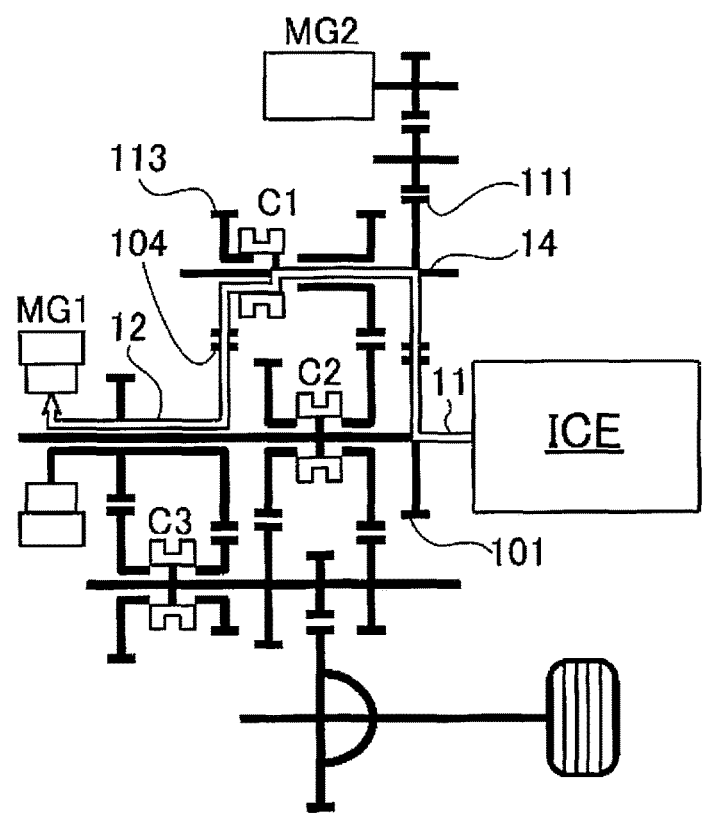
FIG. 4 is a torque flow diagram illustrating the flow of the engine torque in a multistage gear transmission during idle power generation control.

FIG. 4 is a diagram illustrating the flow of the ICE torque of the internal combustion engine ICE in the multistage gear transmission 1 at the time of the above-described MG1 idle power generation (at the time of the "EV-ICEgen" gear shift pattern).

As illustrated in FIG. 4, in the "EV-ICEgen" gear shift pattern, the ICE torque flows from the internal combustion engine ICE to the first shaft 11→first gear 101→eleventh gear 111→the fourth shaft 14→the thirteenth gear 113 fourth gear 104→second shaft 12→first motor/generator MG1.

When the second engagement clutch C2 is in the "N" position and the third engagement clutch C3 is in the "Left" position, the following gear shift patterns are obtained according to the position of the first engagement clutch C1. "EV1st ICE1st" is obtained if the first engagement clutch C1 is in the "Left" position, "EV1st ICE-" is obtained if the first engagement clutch C1 is in the "N" position, and "EV1st ICE3rd" is obtained if the first engagement clutch C1 is in the "Right" position. Here, the gear shift pattern "EV1st ICE-" is an "EV mode" pattern in which the internal combustion engine ICE is stopped and travel is carried out by the first motor/generator MG1, or, a "series HEV mode" pattern in which a first-speed EV travel is carried out by the first motor/generator MG1 while power is generated in the second motor/generator MG2 by the internal combustion engine ICE. For example, when traveling while selecting the "series HEV mode" by "EV1st ICE-," the first engagement clutch C1 is switched from the "N" position to the "Left" position, based on a deceleration due to insufficient driving force. In this case, the vehicle is transitioned to travel by the "parallel HEV mode (first speed)" according to the "EV1st ICE1st" gear shift pattern, in which the driving force is secured.

In this manner, it is possible establish the gear shift stages illustrated in FIG. 3 according to the positions of the first, second, and third engagement clutches C1, C2, C3. Since the contents of each gear shift pattern is not directly related to the substance of the present invention, further detailed descriptions thereof are omitted.

Configuration of the Idle Power Generation Control Process

Figure 5:
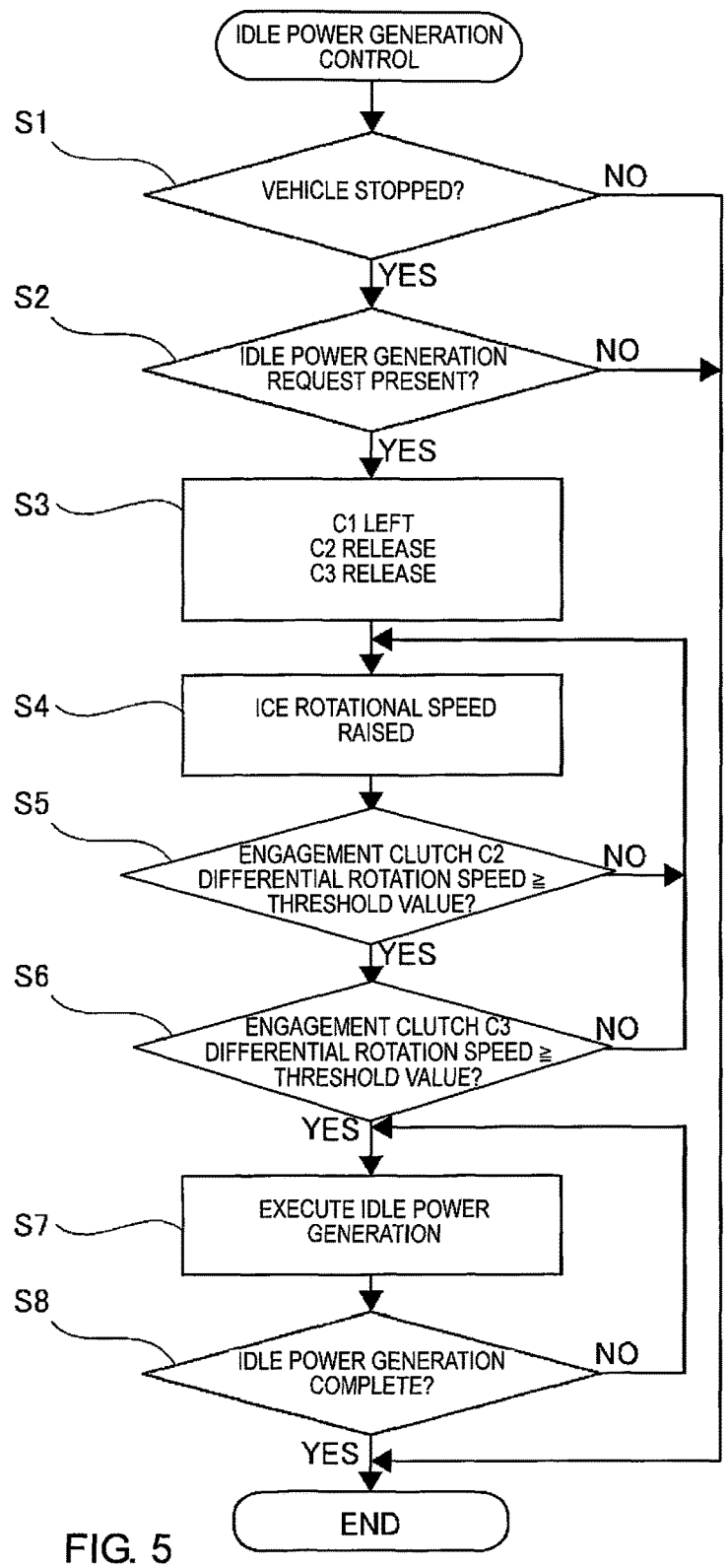
FIG. 5 is a flowchart illustrating the steps of an idle power generation control process carried out in a transmission control unit of the embodiment.

FIG. 5 illustrates the flow of the idle power generation control process carried out by the transmission control unit 23 (starting controller) of the embodiment. Each of the steps in FIG. 5, which shows one example of the configuration of the idle power generation control process, will be described below.

In Step S1, it is determined whether or not the vehicle is stopped. Since an idle power generation control is carried out when the vehicle is stopped, in the case of YES (vehicle stopped), the steps proceed to Step S2, and if NO (vehicle traveling), the following steps are skipped and the program is ended.

In Step S2, it is determined whether or not there is an idle power generation request. The presence/absence of an idle power generation request is determined based on a signal from a switch (not shown) that can be operated by a driver, a remaining battery SOC (State of Charge) of a high-power battery 3, and the like.

If the determination of Step S2 is NO (for example, SOC is greater than or equal to a threshold value), since it is not necessary to execute an idle power generation control, the following steps are skipped and the program is ended. On the other hand, if the determination of Step S2 is YES (idle power generation request present), the steps proceed to Step S3, and the gear shift pattern during idle power generation (EV-ICEgen) is established. That is, the first engagement clutch C1 is switched to the "Left" position, the second engagement clutch C2 is switched to the "N" position, and the third engagement clutch C3 is switched to the "N" position.

Next, the steps proceed to Step S4, the internal combustion engine ICE is started, the rotational speed thereof is raised, and the steps proceed to Step S5.

In Step S5, it is determined whether or not the input-output differential rotation speed of the second engagement clutch C2, which connects the internal combustion engine ICE and the drive wheels 19, is greater than or equal to a threshold value (rotation difference threshold value). The rotation difference threshold value is set to a value with which it is possible to determine that the second engagement clutch C2 cannot be engaged even if the second electric actuator 32 is driven to cause the second engagement clutch C2 to stroke. That is, in a meshing type engagement clutch, if the input-output differential rotation speed is high, even if dog teeth (meshing teeth) are brought close to each other, the dog teeth cannot be meshed (engaging the clutch). In this embodiment, such characteristics of a meshing-type engagement clutch is utilized to increase the rotational speed of the internal combustion engine ICE and to rotate an element that is connected to the internal combustion engine ICE, to thereby increase the input-output differential rotation speed of the second engagement clutch C2 to greater than or equal to a threshold value. Specifically, the rotation difference threshold value is obtained experimentally, on the basis of the shape of the dog teeth to be engaged (pitch width, size of backlash, etc.), the stroke speed of the electric actuators 32, 33 that drive the engagement clutches C2, C3, and the like.

The steps from Step S4 to S5 are repeatedly carried out until the determination of Step S5 becomes YES (C2 input-output differential rotation speed ≥rotation difference threshold value).

When the determination of Step S5 becomes YES, the steps then proceed to Step S6, and it is determined whether or not the input-output differential rotation speed of the third engagement clutch C3, which connects the first motor/generator MG1 and the drive wheels 19, is greater than or equal to a threshold value (rotation difference threshold value). The threshold value is set to a value with which it is possible to determine that the third engagement clutch C3 cannot be engaged even if the third electric actuator 33 is driven to cause the third engagement clutch C3 to stroke.

The steps from Step S4 to S6 are also repeatedly carried out until the determination of Step S6 becomes YES (C3 input-output differential rotation speed ≥rotation difference threshold value).

When the determination of Step S6 becomes YES, the steps then proceed to Step S7, idle power generation is started, and the idle power generation is continued until it is determined that idle power generation is completed in Step S8. In this embodiment, when a request from the driver is no longer present, when it is determined that the remaining battery SOC of the high-power battery 3 is sufficiently high, or, when a traveling range (D, R) is selected by the driver, the idle power generation is ended and the program is ended.

Configuration of the Engagement Clutches

Figure 6:
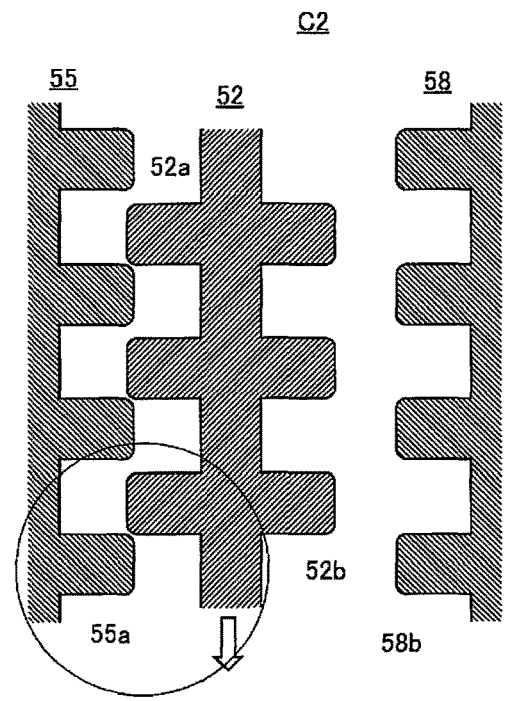
FIG. 6 is a schematic view illustrating the configuration of an engagement clutch, which connects the internal combustion engine and the drive wheels, of the engagement clutches provided to the multistage gear transmission of the embodiment.
Figure 7:
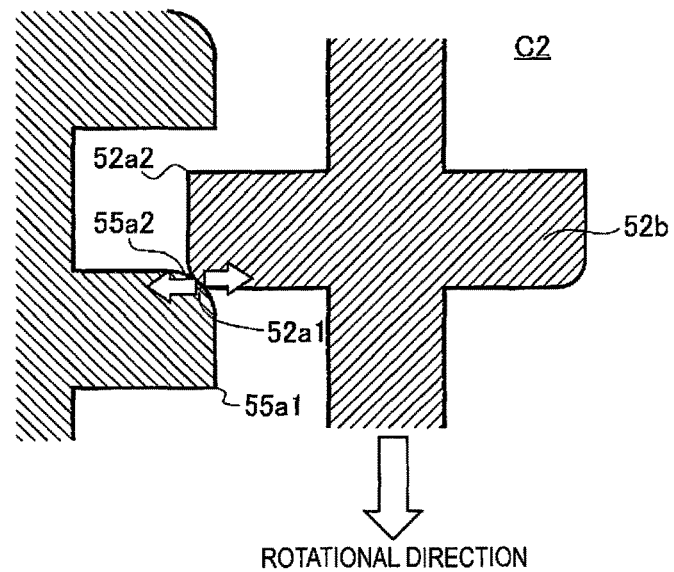
FIG. 7 is a partially enlarged view of the engagement clutch illustrated in FIG. 6.
Figure 8:
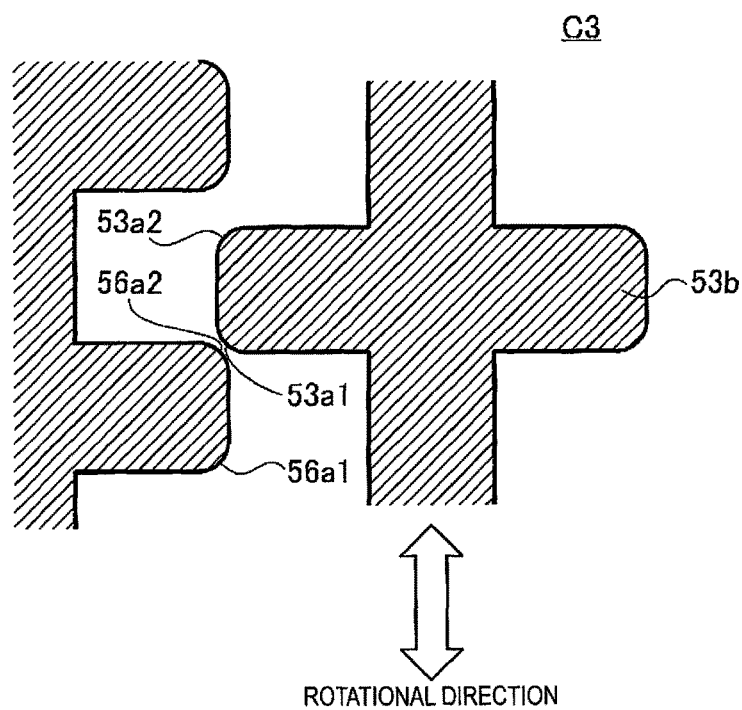
FIG. 8 is a partially enlarged view illustrating the configuration of an engagement clutch, which connects the internal combustion engine and the drive wheels, of the engagement clutches provided to the multistage gear transmission of the embodiment.

FIG. 6 is a schematic view illustrating the dog teeth 52a, 52b, 55a, 58b of the second engagement clutch C2 according to the embodiment, and FIG. 7 is a partially enlarged view thereof. Additionally, FIG. 8 is a partially enlarged view illustrating enlarged dog teeth 53a, 53b, 56a of the third engagement clutch C3. The arrow in the figure indicates the direction of rotation of the coupling sleeves 52, 53 of the second and third engagement clutches C2, C3. Since the second engagement clutch C2 is rotated by the internal combustion engine ICE, the second engagement clutch always rotates in only one direction. On the other hand, the third engagement clutch C3 is rotated by the first motor/generator MG1, and the direction of rotation is reversed between forward travel and backward travel.

FIG. 6 and FIG. 7 illustrate a case in which the second engagement clutch C2 is switched to the "Left" position. As best shown in FIG. 7, at the time of starting the meshing engagement (mesh start region) of the second engagement clutch C2 (coupling sleeve 52), the tips of the dog teeth 52a and the tips of the dog teeth 55a, which are opposite the dog teeth 52a, collide with each other. Specifically, the corner portion 52a1 on the rotational direction side of the coupling sleeve 52, from among the two corner portions 52a1, 52a2 at the tip of the dog teeth 52a, and the corner portion 55a2 on the opposite side of the rotational direction of the coupling sleeve 52, from among the two corner portions 55a1, 55a2 at the tip of the opposing dog teeth 55a, collide with each other at the time of the meshing engagement of the second engagement clutch C2.

Here, in this embodiment, the collision force generated by the collision of the corner portions 52a1, 55a2 of the dog teeth 52a, 55a is converted into a force in the axial direction of the first shaft 11 that supports the second engagement clutch C2. Specifically, by configuring the corner portions 52a1, 55a2 to have a rounded-over surface, the above-described collision force is converted into an axial force in which the dog teeth 52a, 55a are separated from each other.

It goes without saying that dog teeth 52b and dog teeth 58b, which collide with each other if the second engagement clutch C2 is switched to the "Right" position, are also configured in the same manner.

On the other hand, the direction of rotation of the third engagement clutch C3 is reversed between forward travel and backward travel. That is, the colliding portions of the opposing dog teeth 53a, 56a are different between forward travel and backward travel. Therefore, in the third engagement clutch C3, the shape of both corner portions 53a1, 53a2 and 56a1, 56a2 of the tips of the dog teeth 53a, 56a are configured to have a rounded-over surface.

It goes without saying that dog teeth 53b and dog teeth 59b, which collide with each other if the third engagement clutch C3 is switched to the "Right" position, are also configured in the same manner. In addition, depending on the ease of processing the shape of the dog teeth, both corner portions 52a1, 52a2 and 55a1, 55a2 of the second engagement clutch C2 may also be configured to have a rounded-over surface, in the same manner as the third engagement clutch C3.

Next, the actions are described. The "action of the power generation control process," the "characteristic action of the power generation control," and the "action of the engagement clutches" will be described separately, regarding the actions of the power generation control device for a hybrid vehicle according to the embodiment.

Action of the Power Generation Control Process

The action of the power generation control process will be described below, based on the flowchart illustrated in FIG. 5.

When there is a request for power generation by the first motor/generator MG1 while the vehicle is stopped, the steps proceed from Step S1→Step S2→Step S3 in the flowchart of FIG. 5. In Step S3, the internal combustion engine ICE and the first motor/generator MG1 are connected by switching the first engagement clutch C1 to the "Left" position. Additionally, in order to prevent the vehicle from starting to move due to the internal combustion engine ICE during idle power generation, the second and third engagement clutches C2, C3, which connect the internal combustion engine ICE and the drive wheels 19, are released.

Next, the rotational speed of the internal combustion engine ICE is raised until each input-output differential rotation speed of the second and third engagement clutches C2, C3 becomes greater than or equal to the rotation difference threshold value (Step S4-S6). As a result, it is possible to prevent the second and third engagement clutches C2, C3 from becoming engaged, even if the second and third engagement clutches C2, C3 are unintentionally caused to stroke toward the engagement positions, due to an abnormality of the second and third electric actuators 32, 33, which cause the second and third engagement clutches C2, C3 to stroke to the engagement/disengagement positions.

When each input-output differential rotation speed of the second and third engagement clutches C2, C3 becomes greater than or equal to the threshold value, the steps proceed to Step S7 and idle power generation is started, and an idle power generation control is carried out until it is determined that a request for idle power generation is no longer present in Step S8. That is, in the embodiment, idle power generation is carried out only when it can be determined that each input-output differential rotation speed of the second and third engagement clutches C2, C3 is greater than or equal to the threshold value. It is thereby possible to prevent the second and third engagement clutches C2, C3, which connect the internal combustion engine ICE and the drive wheels 19, from becoming engaged while executing an idle power generation control, even if an abnormality occurs in the second and third electric actuators 32, 33. Therefore, it is possible to prevent the vehicle from unintentionally starting to move while carrying out an idle power generation control.

Characteristic Action of the Power Generation Control

As described above, in the embodiment, when carrying out idle power generation by the first motor/generator MG1 while the vehicle is stopped, the internal combustion engine ICE is operated so that the input-output differential rotation speed of the second and third engagement clutches C2, C3 becomes greater than or equal to a rotation difference threshold value at which the engagement clutches C2, C3 are not engaged. That is, when carrying out idle power generation control, in order to prevent the vehicle from starting to move, it is necessary to release the second and third engagement clutches C2, C3 to place the drive wheels 19 and the power source (internal combustion engine ICE) in a disconnected state. However, if an abnormality occurs in the second and third electric actuators 32, 33, which drive the second and third engagement clutches C2, C3, there is the risk that the second and third engagement clutches C2, C3 will become unintentionally engaged. In contrast, in the present embodiment, by operating the internal combustion engine ICE so that the input-output differential rotation speed of the second and third engagement clutches C2, C3 becomes greater than or equal to a rotation difference threshold value when carrying out idle power generation control, it is possible to prevent the second and third engagement clutches C2, C3 from becoming unintentionally engaged, even if an abnormality occurs in the second and third electric actuators 32, 33. Therefore, it is possible to prevent the vehicle from unintentionally starting to move while carrying out an idle power generation control.

The embodiment is configured to start idle power generation by the first motor/generator MG1 when it is determined that the input-output differential rotation speed of the second and third engagement clutches C2, C3 is greater than or equal to the rotation difference threshold value. That is, idle power generation is started after it has been determined that the second and third engagement clutches C2, C3 have reached a state of not becoming unintentionally engaged. Therefore, it is possible to prevent the second and third engagement clutches C2, C3 from becoming unintentionally engaged, even if an abnormality occurs in the second and third electric actuators 32, 33 while idle power generation control is being carried out. Therefore, it is possible to prevent the vehicle from unintentionally starting to move while carrying out an idle power generation control.

When there is an idle power generation request while the vehicle is stopped, the embodiment is configured to engage the first engagement clutch C1 that connects the internal combustion engine ICE and the first motor/generator MG1 from among the first to the third engagement clutches C1, C2, C3, and to release the second and third engagement clutches C2, C3 that connect the internal combustion engine ICE and the first motor/generator MG1 with the drive wheels 19, following which the internal combustion engine ICE is started. That is, the first engagement clutch C1 is engaged and the internal combustion engine ICE and the first motor/generator MG1 are connected in order to carry out idle power generation by the first motor/generator MG1 by the rotation of the internal combustion engine ICE. In addition, by releasing the second and third engagement clutches C2, C3 that connect the power sources (internal combustion engine ICE and first motor/generator MG1) with the drive wheels 19, the vehicle does not start to move even if the internal combustion engine ICE is started in order to carry out idle power generation. Therefore, it is possible to prevent the vehicle from unintentionally starting to move when starting idle power generation control.

Action of the Engagement Clutches

In the embodiment, the second and third engagement clutches C2, C3 are configured from a pair of dog teeth (for example 52a and 55a) that are disposed facing each other, and have dog teeth shapes that convert the tooth collision force in the mesh start region into a force in the axial direction in which the dog teeth (for example 52a and 55a) are separated from each other, when there is a differential rotation speed between the pair of dog teeth (for example 52a and 55a) due to an operation of the internal combustion engine ICE while the second and third engagement clutches C2, C3 are released. That is, when the pair of dog teeth are meshing engaged while turning with a differential rotation speed, the tips of the dog teeth collide with each other and generate a tooth collision force in a region where a meshing engagement is started (mesh start region). In the embodiment, the shape of the dog teeth is configured so as to be able to convert this tooth collision force from the direction of rotation of the engagement clutches C2, C3 into the axial direction (more precisely, in the axial direction in which the dog teeth are separated from each other). It thereby becomes difficult to mesh the dog teeth of the engagement clutches C2, C3. Therefore, it is possible to effectively prevent an unintended engagement of the engagement clutches C2, C3. In addition, since it becomes difficult for the second and third engagement clutches C2, C3 to become engaged, it becomes possible to set the above-described value of the rotation difference threshold value to a smaller value.

In the embodiment, the second and third engagement clutches C2, C3 are configured to have a dog tooth shape forming a rounded-over surface on at least one of the tip portions of the dog teeth (corner portion. For example, 52a1 and 52a2). It is thereby possible to convert the tooth collision force of the tips of opposing dog teeth in the axial direction in which the dog teeth are separated from each other, in the mesh start region of the second and third engagement clutches C2, C3. Therefore, it is possible to prevent an unintended engagement of the second and third engagement clutches C2, C3 more effectively.

Next, the effects are described. The effects listed below can be obtained by the power generation control device for a hybrid vehicle according to the embodiment.

(1) In a hybrid vehicle comprising an electric motor (first motor/generator MG1) and an internal combustion engine ICE as drive sources, which is also provided with a transmission (multistage gear transmission 1) that realizes a plurality of gear shift stages in a drive system from the power sources to drive wheels 19, the transmission (multistage gear transmission 1) having engagement clutches (second and third engagement clutches C2, C3) as shifting elements that switch between gear shift stages for meshing engagement due to a stroke from a disengaged position, comprising a power generation controller (transmission control unit 23) that transmits a drive force from the internal combustion engine ICE to the electric motor, and that carries out power generation by the electric motor (first motor/generator MG1) based on a power generation request, where the engagement clutches (second and third engagement clutches C2, C3) being clutches that connect the driving sources (first motor/generator MG1, internal combustion engine ICE) and the drive wheels 19, and when idle power generation by the electric motor (first motor/generator MG1) is carried out while the vehicle is stopped, the power generation controller (transmission control unit 23) operates the internal combustion engine ICE so that an input-output differential rotation speed of the engagement clutches (second and third engagement clutches C2, C3) becomes greater than or equal to a rotation difference threshold value at which the engagement clutches (second and third engagement clutches C2, C3) are not engaged (FIG. 5, S4-S6). Thus, it is possible to prevent the second and third engagement clutches C2, C3 from becoming unintentionally engaged, even if an abnormality occurs in the second and third electric actuators 32, 33. Therefore, it is possible to prevent the vehicle from unintentionally starting to move while carrying out an idle power generation control.

(2) The power generation controller (transmission control unit 23) starts the idle power generation by the electric motor (first motor/generator MG1) when it is determined that the input-output differential rotation speed of the engagement clutches (second and third engagement clutches C2, C3) is greater than or equal to the rotation difference threshold value (FIG. 5, S4-S7). Thus, in addition to the effect of (1), it is possible to prevent the second and third engagement clutches C2, C3 from becoming unintentionally engaged, even if an abnormality occurs in the second and third electric actuators 32, 33 while idle power generation control is being carried out. Therefore, it is possible to prevent the vehicle from unintentionally starting to move while carrying out an idle power generation control.

(3) The transmission (multistage gear transmission 1) has an idle power generation engagement clutch (first engagement clutch C1) for meshing engagement due to a stroke from a disengaged position and connects the internal combustion engine ICE and the electric motor (first motor/generator MG1), and when there is an idle power generation request while the vehicle is stopped, the power generation controller (transmission control unit 23) engages the idle power generation engagement clutch (first engagement clutch C1), releases the engagement clutches (second and third engagement clutches C2, C3), and thereafter starts the internal combustion engine ICE (FIG. 5, S3-S4). That is, in addition to the effect of (2), idle power generation is carried out only when it has been determined that the second and third engagement clutches C2, C3 have reached a state of not being unintentionally engaged. Therefore, it is possible to prevent the second and third engagement clutches C2, C3 from becoming unintentionally engaged, even if an abnormality occurs in the second and third electric actuators 32, 33 while idle power generation control is being carried out. Therefore, it is possible to prevent the vehicle from unintentionally starting to move while carrying out an idle power generation control.

(4) The engagement clutches (second and third engagement clutches C2, C3) are configured from opposed clutch portions having a pair of dog teeth (for example dog teeth 52a, 55a) with dog teeth shapes that convert a tooth collision force in the mesh start region into a force in the axial direction, in which the pair of dog teeth are separated from each other, when there is a differential rotation speed between the pair of dog teeth due to an operation of the internal combustion engine ICE while the engagement clutches (second and third engagement clutches C2, C3) are released (FIGS. 6-8). Thus, in addition to the effects of (1) to (3), it becomes more difficult to mesh the dog teeth of the engagement clutches C2, C3. Therefore, it is possible to more effectively prevent an unintended engagement of the engagement clutches C2, C3. In addition, since it becomes difficult for the second and third engagement clutches C2, C3 to be engaged, it becomes possible to set the above-described value of the rotation difference threshold value to a smaller value.

(5) In a hybrid vehicle comprising an electric motor (first motor/generator MG1) and an internal combustion engine ICE as drive sources, which is also provided with a transmission (multistage gear transmission 1) that realizes a plurality of gear shift stages in a drive system from the power sources to a drive wheel, the transmission (multistage gear transmission 1) having engagement clutches (second and third engagement clutches C2, C3) as shifting elements that switch between gear shift stages for meshing engagement due to a stroke from a disengaged position, comprising a power generation controller (transmission control unit 23) that releases the engagement clutches (second and third engagement clutches C2, C3) connecting the power sources and the drive wheel, receives a drive force from the internal combustion engine, and carries out idle power generation by the electric motor (first motor/generator MG1), based on a power generation request while the vehicle is stopped, where the engagement clutches are configured from opposed clutch portions having a pair of dog teeth with dog teeth shapes that convert a tooth collision force in the mesh start region to a force in the axial direction in which the pair of dog teeth are separated from each other, when there is a differential rotation speed between the pair of dog teeth due to an operation of the internal combustion engine ICE while the engagement clutches (second and third engagement clutches C2, C3) are released (FIGS. 6-8). Therefore, it is possible to effectively prevent an unintended engagement of the engagement clutches C2, C3. In addition, since it becomes difficult for the second and third engagement clutches C2, C3 to become engaged, it becomes possible to set the above-described value of the rotation difference threshold value to a smaller value.

(6) The engagement clutches have a dog tooth shape forming a rounded-over surface on at least one of the tip portions of the dog teeth (corner portion. 52a1, 55a2, 53a1, 53a2, 56a1, 56a2, etc.) (FIGS. 6-8). Thus, it is possible to more effectively prevent an unintended engagement of the second and third engagement clutches C2, C3.

The power generation control device of the present invention was described above based on the embodiment, but specific configurations thereof are not limited to the first embodiment, and various modifications and additions to the design can be made without departing from the scope of the invention according to each claim in the Claims.

In the embodiment, an example was shown in which the same value is used for the rotation difference threshold value of the second engagement clutch C2 and the rotation difference threshold value of the third engagement clutch C3. However, the rotation difference threshold value may be configured to be different according to the shape of the corresponding dog clutch, the stroke speed of the electric actuator, and the like.

In the embodiment, an example was shown in which the shape of the tip portions of the dog teeth (corner portion) is a rounded-over surface. However, the shape may be any shape with which it is possible to convert the tooth collision force between a pair of dog teeth into a force in the axial direction in which the dog teeth are separated from each other; for example, a chamfered shape is also possible. The radii of the rounded-over surface of the mutually colliding dog teeth (for example 52b and 58b, 53b and 59b) may be the same or different from each other.

In the embodiment, an example was shown in which the power generation control device of the present invention is applied to a hybrid vehicle comprising, as drive system components, one engine, two motor/generators, and a multistage gear transmission having three engagement clutches. However, the power generation control device of the present invention may be applied to a vehicle as well.

In the embodiment, an example was shown in which the present invention was applied to a multistage gear transmission 1 comprising EV first to second speeds as EV gear shift stages, and ICE first to fourth speeds as ICE gear shift stages. However, the power generation control device of the present invention may be applied to any multistage gear transmission, as long as the configuration is able to carry out idle power generation control.

The invention claimed is:

1. A power generation control device for a hybrid vehicle having an electric motor and an internal combustion engine as power sources, and having a transmission that realizes a plurality of gear shift stages in a drive system from the power sources to a drive wheel, the transmission having engagement clutches as shifting elements that switch between gear shift stages for meshing engagement due to a stroke from a disengaged position, the power generation control device comprising:

a power generation controller that transmits a drive force from the internal combustion engine to the electric motor, and that carries out power generation by the electric motor based on a power generation request, the engagement clutches being clutches that connect the power sources and the drive wheel, and when idle power generation by the electric motor is carried out while the vehicle is stopped, the power generation controller operates the internal combustion engine so that an input-output differential rotation speed of the engagement clutches becomes greater than or equal to a rotation difference threshold value at which the engagement clutches are not engaged.

2. The power generation control device according to claim 1, wherein the power generation controller is configured to
determine whether the input-output differential rotation speed is greater or equal to the rotation difference threshold value, and
start the idle power generation by the electric motor when the input-output differential rotation speed is greater than or equal to the rotation difference threshold value.

3. The power generation control device according to claim 2, wherein the transmission has an idle power generation engagement clutch for meshing engagement due to a stroke from a disengaged position and connects the internal combustion engine and the electric motor, and when there is an idle power generation request while the vehicle is stopped, the power generation controller engages the idle power generation engagement clutch, releases the engagement clutches, and thereafter starts the internal combustion engine.

4. The power generation control device according to claim 3, wherein the engagement clutches include opposed clutch portions having a pair of dog teeth, with dog teeth shapes that convert a tooth collision force in a mesh start region into a force in an axial direction in which the pair of dog teeth are separated from each other, when there is a differential rotation speed between the pair of dog teeth due to an operation of the internal combustion engine while the engagement clutches are released.

5. The power generation control device according to claim 2, wherein the engagement clutches include opposed clutch portions having a pair of dog teeth, with dog teeth shapes that convert a tooth collision force in a mesh start region into a force in an axial direction in which the pair of dog teeth are separated from each other, when there is a differential rotation speed between the pair of dog teeth due to an operation of the internal combustion engine while the engagement clutches are released.

6. The power generation control device according to claim 1, wherein the engagement clutches are configured from a pair of dog teeth that are disposed such that the clutch portions oppose each other, and have dog teeth shapes that convert a tooth collision force in a mesh start region into a force in an axial direction in which the pair of dog teeth are separated from each other, when there is a differential rotation speed between the pair of dog teeth due to an operation of the internal combustion engine while the engagement clutches are released.

* * * * *